US012725225B2

(12) United States Patent
Kim

(10) Patent No.: US 12,725,225 B2
(45) Date of Patent: Sep. 1, 2026

(54) HIERARCHICAL SUB-IMAGE HISTOGRAM EQUALIZATION SYSTEM AND METHOD

(71) Applicant: ELECTRONICS AND TELECOMMUNICATIONS RESEARCH INSTITUTE, Daejeon (KR)

(72) Inventor: Won Jong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 269 days.

(21) Appl. No.: 18/421,791

(22) Filed: Jan. 24, 2024

(65) Prior Publication Data

US 2024/0249386 A1 Jul. 25, 2024

(30) Foreign Application Priority Data

Jan. 25, 2023 (KR) ........................ 10-2023-0009505

(51) Int. Cl.
*G06K 9/00* (2022.01)
*G06T 5/40* (2006.01)
*G06T 7/11* (2017.01)

(52) U.S. Cl.
CPC . *G06T 5/40* (2013.01); *G06T 7/11* (2017.01)

(58) Field of Classification Search
CPC ..... G06T 5/40; G06T 7/11; G06T 5/92; G06T 5/30; G06T 7/10; G06T 5/90; G06T 2207/10024; G06T 5/70; G06T 2207/20021; G06T 5/94; G06T 5/20; G06T 7/136; G06T 2207/10016
See application file for complete search history.

(56) References Cited

U.S. PATENT DOCUMENTS 7,840,066 B1 * 11/2010 Chen ........................ G06T 5/90 382/254
11,182,886 B2 11/2021 Cho et al.
11,399,142 B2 7/2022 Park
2008/0056567 A1 3/2008 Kwon et al.
2022/0092753 A1 * 3/2022 Duval ...................... G06T 5/50
(Continued)

FOREIGN PATENT DOCUMENTS

KR 0183830 B1 5/1999
KR 10-2008-0021983 A 3/2008
KR 10-0919167 B1 9/2009
(Continued)

OTHER PUBLICATIONS

Sim, Kok Swee, Chih Ping Tso, and Yik Yee Tan. "Recursive sub-image histogram equalization applied to gray scale images." Pattern Recognition Letters 28.10 (2007): 1209-1221. (Year: 2007).*
(Continued)

*Primary Examiner* — Gregory A Morse
*Assistant Examiner* — Owais I Memon

(57) ABSTRACT

Disclosed herein is an image processing apparatus. The apparatus may include a memory, and a processor connected to the memory, wherein the processor may divide an input image hierarchically, determine whether each sub-image requires histogram equalization, and perform histogram equalization on a sub-image that requires histogram equalization.

4 Claims, 4 Drawing Sheets

(56) References Cited

U.S. PATENT DOCUMENTS

2022/0237755 A1 7/2022 Yang

FOREIGN PATENT DOCUMENTS

| | | | |
|---|---|---|---|
| KR | 10-2010-0097892 | A | 9/2010 |
| KR | 10-2014-0045856 | A | 4/2014 |
| KR | 10-2014-0086421 | A | 7/2014 |
| KR | 10-2015-0002013 | A | 1/2015 |
| KR | 10-2016-0065474 | A | 6/2016 |
| KR | 10-1877808 | B1 | 8/2018 |

OTHER PUBLICATIONS

Mi Jin Jun et al., “Image Histogram Equalization Based on Gaussian Mixture Model,” Journal of Korea Multimedia Society, 2012.

Soyoung Chung et al., “Histogram Equalization using Gamma Transformation,” KIISE Transactions on Computing Practices, 2014.

Hyunsup Yoon et al., “Contrast Enhancement Using a Density based Sub-histogram Equalization Technique,” Journal of the Institute of Electronics Engineers of Korea SC, 2009.

Jong Seob Yun et al., “An Improvement of Histogram Equalization Using Edge Information of an Image,” Journal of Korea Multimedia Society, 2017.

* cited by examiner

110 MEMORY

PROCESSOR

OUTPUT DEVICE 130

120 INPUT DEVICE

FIG. 3

```
Hiererchical_Histogram_Equalization(image)
{
    equalized_image = histogram_equalization(image)
}
```

```
Histogram_Equalization(image)
{
    histogram = Calculate_histogram(image)
    If Decide_HE(histogram) == True
        if Decide_Split(image)
            sub_images = Split_image(image)
            for each sub_image in sub_images
                Equalized_image = Histogram_Equalization(sub_image)
        else
            equalized_image = Perform_Histogram_Equalization(image)
            return equalized_image
else
    return image
}
```

HIERARCHICAL SUB-IMAGE HISTOGRAM EQUALIZATION SYSTEM AND METHOD

CROSS-REFERENCE TO RELATED APPLICATION

This application claims priority to and the benefit of Korean Patent Application No. 10-2023-0009505, filed on Jan. 25, 2023, the invention of which is incorporated herein by reference in its entirety.

BACKGROUND

1. Field of the Invention

The present invention relates to an image processing apparatus and method, and more particularly, to an image processing apparatus and method that applies histogram equalization to an image.

2. Discussion of Related Art

There is a histogram equalization method that redistributes pixel values so that a histogram of an image has a uniform distribution for each pixel value by obtaining the histogram of the image as a method of improving the contrast of an image. The histogram of an image means a graph that represents the number of pixels corresponding to each pixel value, in the range from the darkest to the brightest areas of the image.

According to the histogram equalization method, an image processing apparatus may adjust the pixel values of the image such that the number of pixels corresponding to each pixel value has a uniform distribution in the histogram of the image.

In the related art, a method of applying histogram equalization to the entire input image is mainly used.

However, histogram equalization is often necessary for only a portion of the image, and the structure is often not uniformly divided in the form of a grid.

The background technology of the present invention is disclosed in Korean Patent Registration No. 10-0919167 (published on Sep. 28, 2009 and entitled 'System and method for histogram equalization').

SUMMARY OF THE INVENTION

The present invention is directed to providing an image processing apparatus and method that allows histogram equalization to be applied only to an area of the image that requires histogram equalization.

According to an aspect of the present invention, there is provided an image processing apparatus including a memory, and a processor connected to the memory, wherein the processor may divide an input image hierarchically, determine whether each sub-image requires histogram equalization, and perform histogram equalization on a sub-image that requires histogram equalization.

According to some embodiments of the present invention, the processor may divide the input image in the form of a hierarchical structure until the input image becomes equal to or less than a preset size, and divide a sub-image requiring histogram equalization among sub-images in each hierarchy.

According to some embodiments of the present invention, the processor may determine whether histogram equalization is required based on histogram characteristics of each sub-image.

According to some embodiments of the present invention, the processor may determine whether histogram equalization is required based on a linearity of a cumulative distribution function (CDF) of the histogram.

According to some embodiments of the present invention, the processor may determine whether histogram equalization is required based on a deviation between a graph of the cumulative distribution function and an approximate straight line slope of the cumulative distribution function.

According to some embodiments of the present invention, the processor may determine whether histogram equalization is required based on a mean or standard deviation of the histogram.

According to some embodiments of the present invention, the processor may hierarchically divide the image using a binary or quadratic division method.

According to another aspect of the present invention, there is provided an image processing method including determining, by a processor, whether histogram equalization is required for each sub-image while hierarchically dividing an input image, and performing, by the processor, histogram equalization on a sub-image that requires histogram equalization.

According to some embodiments of the present invention, in the determining of whether histogram equalization is required, the processor may determine whether histogram equalization is required based on histogram characteristics of each sub-image.

According to some embodiments of the present invention, in the determining of whether histogram equalization is required, the processor may determine whether histogram equalization is required based on a linearity of a cumulative distribution function (CDF) of the histogram.

According to some embodiments of the present invention, in the determining of whether histogram equalization is required, the processor may determine whether histogram equalization is required based on a deviation between a graph of the cumulative distribution function and an approximate straight line slope of the cumulative distribution function.

According to some embodiments of the present invention, in the determining of whether histogram equalization is required, the processor may determine whether histogram equalization is required based on a mean or standard deviation of the histogram.

According to some embodiments of the present invention, in the determining of whether histogram equalization is required, the processor may divide the input image in the form of a hierarchical structure until the input image becomes equal to or less than a preset size, and divide only a sub-image requiring histogram equalization among sub-images in each hierarchy.

According to some embodiments of the present invention, in the determining of whether histogram equalization is required, the processor may hierarchically divide the input image using a binary or quadratic division method.

According to still another aspect of the present invention, there is provided an image processing method including determining, by a processor, whether histogram equalization is required based on a histogram of an input image; determining, by the processor, whether the input image is required to be divided when histogram equalization of the input image is required, dividing, by the processor, the input image into a plurality of first sub-images, when the division of the input image is required, determining, by the processor, whether histogram equalization is required based on a histogram of each of the first sub-images, and determining, by the processor, when a first sub-image requiring histogram equalization exists among the first sub-images, whether the corresponding first sub-image is required to be divided, dividing the first sub-image requiring to be divided into a plurality of second sub-images, performing repeatedly a process of dividing a second sub-image requiring histogram equalization in the form of a hierarchical structure until the second sub-image requiring histogram equalization among the second sub-images is divided to a size equal to or less than a preset reference image size and determining whether histogram equalization is required to be applied to the second sub-image, and performing histogram equalization on a sub-image requiring histogram equalization among the sub-images divided to the size equal to or less than the reference image size.

According to some embodiments of the present invention, in the performing of histogram equalization, the processor may perform histogram equalization on a first sub-image that is not required to be divided among the first sub-images requiring histogram equalization.

According to some embodiments of the present invention, in the determining of whether histogram equalization is required, the processor may determine whether histogram equalization is required based on a linearity of a cumulative distribution function (CDF) of the histogram.

According to some embodiments of the present invention, in the determining of whether histogram equalization is required, the processor may determine whether histogram equalization is required based on a deviation between a graph of the cumulative distribution function and an approximate straight line slope of the cumulative distribution function.

According to some embodiments of the present invention, in the determining of whether histogram equalization is required, the processor may determine whether histogram equalization is required based on a mean or standard deviation of the histogram.

According to some embodiments of the present invention, in the dividing of the input image, the processor may divide the input image using a binary or quadratic division method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a block diagram for describing an image processing apparatus according to one embodiment of the present invention;

FIG. 3 is an exemplified view illustrating a virtual program implementing hierarchical histogram equalization according to one embodiment of the present invention.

DETAILED DESCRIPTION OF EXEMPLARY EMBODIMENTS

Figure 2A:
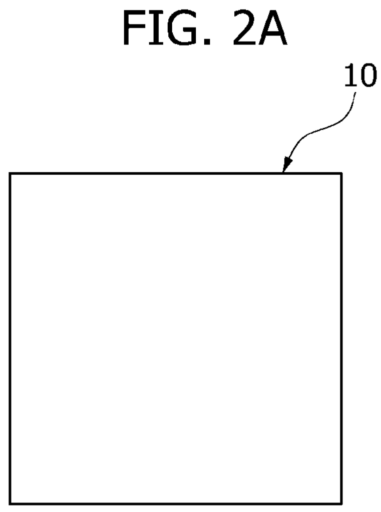
FIGS. 2A, 2B, and 2C are exemplified views for describing a hierarchical image division using a quadratic division method according to one embodiment of the present invention.

Hereinafter, an image processing apparatus and method according to one embodiment of the present invention will be described below with reference to the accompanying drawings. Here, thicknesses of lines illustrated in the drawings, sizes of constituent elements, or the like may be exaggerated for clarity and convenience of description. In addition, the terms used below are defined in consideration of the functions thereof in the present invention and may vary depending on the intention of a user or an operator or a usual practice. Therefore, such terms should be defined based on the entire contents of the present specification.

Figure 1:
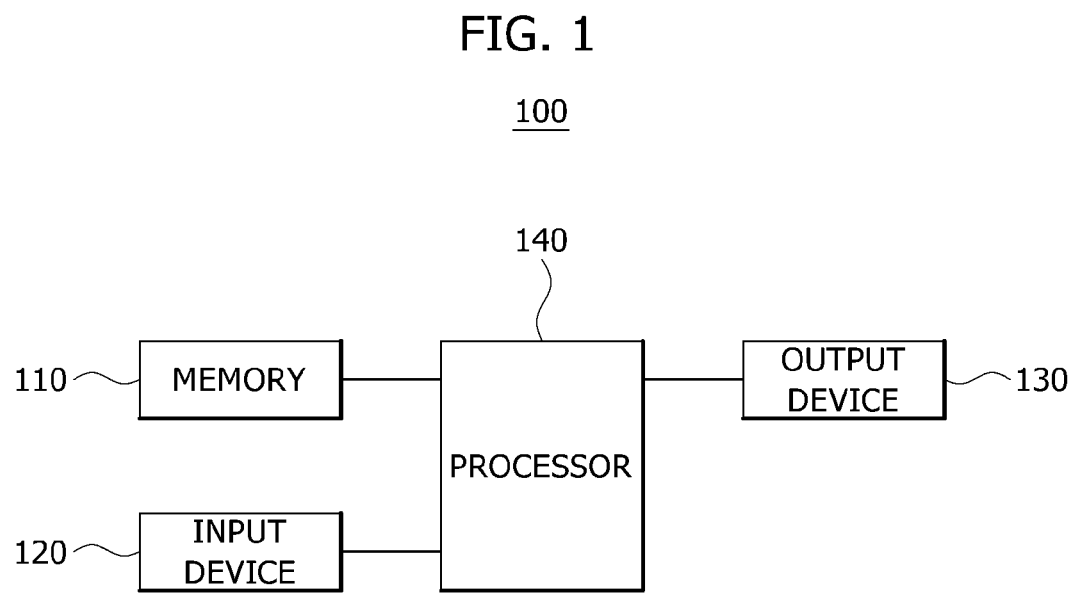

FIG. 1 is a block diagram for describing an image processing apparatus according to one embodiment of the present invention, FIG. 2 is an exemplified view for describing a hierarchical image division using a quadratic division method according to one embodiment of the present invention, and FIG. 3 is an exemplified view illustrating a virtual program implementing hierarchical histogram equalization according to one embodiment of the present invention.

With reference to FIG. 1, an image processing apparatus 100 according to one embodiment of the present invention may include a memory 110, an input device 120, an output device 130, and a processor 140.

The memory 110 is a configuration for storing data related to an operation of the image processing apparatus 100. In particular, the memory 110 may store an application (program or applet) that determines whether histogram equalization is required for each sub-image while hierarchically dividing the image, and performs histogram equalization on a sub-image of a final hierarchy that requires histogram equalization, and the stored information may be adaptively selected by the processor 140 as necessary. That is, the memory 110 stores various types of data generated during a process of executing an operating system or application (a program or an applet) for operating the image processing apparatus 100. In this case, the memory 110 is collectively referred to as a non-volatile storage device that continues to maintain the stored information even though no electric power is supplied, and a volatile storage device that requires electric power to maintain the stored information. In addition, the memory 110 may function to temporarily or permanently store data to be processed by the processor 140. In this case, the memory 110 may include magnetic storage media or flash storage media in addition to the volatile storage device that requires electric power to maintain the stored information. However, the scope of the present invention is not limited thereto.

The input device 120 is provided to input user commands or the like, and for example, may be provided as a user interface such as a keyboard, a mouse, a touchpad, a touchscreen, an electronic pen, a touch button, or the like.

The output device 130 may output an image or the like in which histogram equalization has been performed by the control of the processor 140. The output device 130 may be implemented as a display, a printer, or the like. Here, the display may be implemented as, for example, a thin film transistor-liquid crystal display (TFT-LCD) panel, a light emitting diode (LED) panel, an organic LED (OLED) panel, an active matrix OLED (AMOLED) panel, a flexible panel, or the like.

The processor 140 may be implemented as at least one of an application specific integrated circuit (ASIC), a digital signal processor (DSP), a programmable logic device (PLD), field programmable gate arrays (FPGAs), a central processing unit (CPU), a microcontroller, and/or a microprocessor.

The processor 140 may determine whether histogram equalization is required for each sub-image while hierarchically dividing an input image, and perform histogram equalization on a sub-image of a final hierarchy that requires histogram equalization.

Hereinafter, an operation of the processor 140 will be described in detail.

The processor 140 may generate a histogram that expresses the frequency of a pixel based on the intensity of the pixel included in the image that is input. In this case, the histogram has the intensity of the pixel on the x-axis and the frequency of the pixel on the y-axis. That is, the histogram is a graph that counts how many pixels of each intensity are in the corresponding image. Therefore, the histogram has the form of a stacked bar graph that can express the frequency of pixels of a specific intensity among the pixels included in the image.

In addition, the processor 140 may generate a histogram for each of R, G, and B of the pixels included in the image.

In addition, the processor 140 may generate a histogram including in-image coordinates for each pixel included in the image.

When the histogram characteristics of the image that is input are analyzed, the processor 140 may determine whether histogram equalization is required based on the histogram characteristics of the image. In this case, the processor 140 may determine whether histogram equalization is required based on a linearity of a cumulative distribution function (CDF) of the histogram. That is, the processor 140 may determine whether histogram equalization is required based on a deviation between a graph of the cumulative distribution function and an approximate straight line slope of the cumulative distribution function. For example, when the deviation between the approximate straight line slope of the cumulative distribution function and the graph of the cumulative distribution function is equal to or greater than a preset certain value, the processor 140 may determine that histogram equalization is required. That is, when a value at a specific point in the graph of the cumulative distribution function deviates from the approximate straight line slope of the cumulative distribution function by the certain value or more, the processor 140 may determine that histogram equalization is required. Here, the certain value is a preset value that may be changed arbitrarily.

In addition, the processor 140 may determine whether histogram equalization is required based on a mean or standard deviation of the histogram. For example, when the mean of the histogram deviates from a preset reference mean range, the processor 140 may determine that histogram equalization is required. In addition, when the standard deviation of the histogram is equal to or greater than a preset threshold value, the processor 140 may determine that histogram equalization is required. Here, the reference mean range and threshold value are preset values that may be changed arbitrarily.

When histogram equalization is required, the processor 140 may determine whether the image is required to be divided. In this case, the processor 140 may determine whether a size of the image is equal to or less than a preset reference image size, and determine that the image is required to be divided when the size of the image is not equal to or less than the reference image size. Here, the reference image size is set to the size of the image (e.g., 8×8) or the number of horizontal/vertical pixels, which may be preset by a user, set by default, or arbitrarily changed. The user may set the reference image size differently depending on the resolution of the image.

When the image is required to be divided, the processor 140 may divide the image into a plurality of first sub-images. Here, the first sub-image is generated by dividing the image into a plurality of areas, and the processor 140 may use a binary or quadratic division method, or the like, to divide the image. Here, the binary division method may be a method of dividing the image horizontally and then vertically, or vice versa. The quadratic division method may be a method of dividing the image horizontally and vertically at the same time.

When the image is divided into the plurality of first sub-images, the processor 140 may analyze the histogram characteristics of each first sub-image, determine whether histogram equalization is required based on the histogram characteristics of each sub-image, determine whether a division is required for a first sub-image that requires histogram equalization among the first sub-images, and divide the first sub-image that requires a division into a plurality of second sub-images. Here, the second sub-image is generated by dividing the first sub-image into a plurality of areas, and the processor 140 may divide the first sub-image using the horizontal and vertical binary division method or the quadratic division method that divides the image horizontally and vertically at the same time.

Thereafter, the processor 140 may perform repeatedly a process of dividing a second sub-image requiring histogram equalization in the form of a hierarchical structure until the second sub-image requiring histogram equalization is divided to a size equal to or less than the preset reference image size and determining whether histogram equalization is required to be applied to the second sub-image.

Figure 2B:
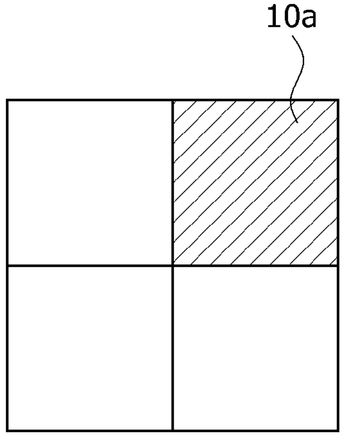
Figure 2C:
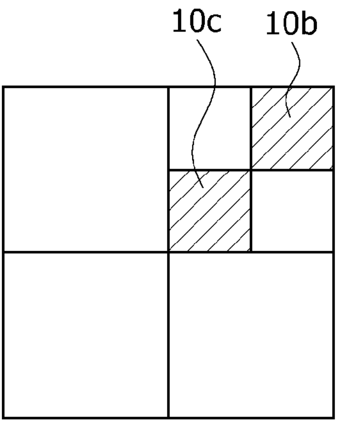

The division of the image in the form of a hierarchical structure will be described with reference to FIG. 2. The processor 140 may divide an input image 10 as illustrated in FIG. 2A into four first sub-images as illustrated in FIG. 2B, and divide a 1-2 sub-image 10*a* that requires histogram equalization among the first sub-images into four second sub-images as illustrated in FIG. 2C. In addition, the processor may determine whether histogram equalization is required for a 2-2 sub-image 10*b* and a 2-3 sub-image 10*c* among the four second sub-images illustrated in FIG. 2C. As described above, the processor 140 divides the sub-images requiring histogram equalization until the size of the sub-image becomes equal to or less than the reference image size, which may be referred to as a division in the form of a hierarchical structure or a hierarchical division.

The processor 140 may apply histogram equalization to the sub-images that require histogram equalization among the sub-images that are divided to be less than or equal to the reference image size. In this case, the processor 140 may use various histogram equalization methods, such as histogram equalization (HE), brightness preserving bi-histogram equalization (BBHE), dynamic histogram equalization (DHE), adaptive histogram equalization (AHE), or the like.

A virtual program that hierarchically divides an input image, determines whether histogram equalization is required for each sub-image, and performs histogram equalization on a sub-image in a final hierarchy that requires histogram equalization may be implemented using a recursive function call, as illustrated in FIG. 3.

The image processing apparatus 100 according to the embodiment of the present invention may further include a communication interface (not illustrated). The communication interface may provide an interface that is necessary to provide transmission and reception signals between the image processing apparatus 100 and an external device in the form of packet data in conjunction with a communication network. In addition, the communication interface may be a device that includes hardware and software necessary to transmit and receive a signal, such as a control signal or a data signal through a wired or wireless connection with another network device. In addition, the communication interface may be implemented in various forms, such as a short-range communication module, a wireless communication module, a mobile communication module, a wired communication module, or the like.

The image processing apparatus 100 configured as described above can efficiently improve the quality of the entire image by determining whether histogram equalization is required for each sub-image while hierarchically dividing the image, and performing histogram equalization only for the sub-images that require histogram equalization. That is, the image processing apparatus 100 can improve the quality of the entire image by applying histogram equalization to only the areas of the input image that require histogram equalization.

Figure 4:
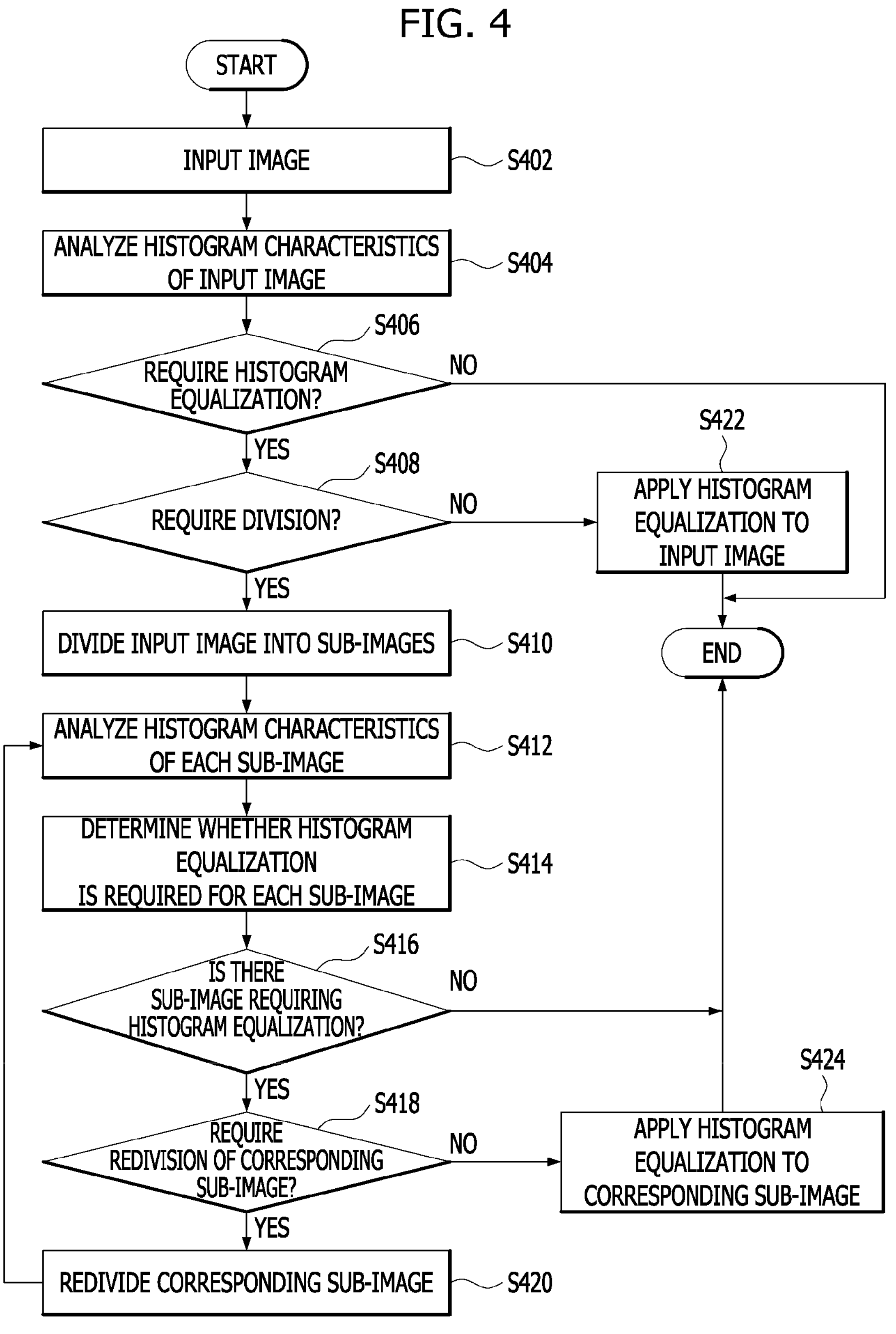
FIG. 4 is a flowchart for describing an image processing method according to one embodiment of the present invention.

FIG. 4 is a flowchart for describing an image processing method according to one embodiment of the present invention.

With reference to FIG. 4, the image processing apparatus 100 generates a histogram of an input image (S404) when the image is input (S402). In this case, the image processing apparatus 100 may generate a histogram that expresses the frequency of a pixel depending on the intensity of the pixel included in the image. In addition, the image processing apparatus 100 may generate a histogram including in-image coordinates for each pixel included in the image.

When operation S404 is performed, the image processing apparatus 100 determines whether histogram equalization is required based on histogram characteristics of the image (S406). In this case, the image processing apparatus 100 may determine whether histogram equalization is required based on a linearity of a cumulative distribution function (CDF) of the histogram. In addition, the image processing apparatus 100 may determine whether histogram equalization is required based on a mean or standard deviation of the histogram.

When histogram equalization is required as a result of the determination in operation S406, the image processing apparatus 100 determines whether the image is required to be divided (S408). In this case, the image processing apparatus 100 may determine whether a size of the input image is equal to or less than a preset reference image size, and determine that the image is required to be divided when the size of the image is not equal to or less than the reference image size.

When the image is required to be divided as a result of the determination in operation S408, the image processing apparatus 100 divides the input image with a preset division method (S410). In this case, the image processing apparatus 100 may divide the input image using a horizontal and vertical binary division method or a quadratic division method that divides the input image horizontally and vertically at the same time. Then, the input image may be divided into a plurality of sub-images.

When operation S410 is performed, the image processing apparatus 100 analyzes the histogram characteristics of each sub-image (S412) and determines whether histogram equalization is required based on the histogram characteristics of each sub-image (S414).

When there is a sub-image that requires histogram equalization as a result of the determination in operation S414 (S416), the image processing apparatus 100 determines whether the sub-image that requires histogram equalization is required to be redivided (S418). That is, the image processing apparatus 100 may determine whether a size of the sub-image that requires histogram equalization is equal to or less than the reference image size, and determine that redivision is required when the size of the sub-image is not equal to or less than the reference image size.

When the sub-image is required to be redivided as a result of the determination in operation S418, the image processing apparatus 100 redivides the corresponding sub-image with a preset division method (S420) and performs operation S412. In this case, the image processing apparatus 100 may redivide the sub-image using a horizontal and vertical binary division method or a quadratic division method that divides the input image horizontally and vertically at the same time.

When the input image is not required to be divided as the result of the determination in operation S408, the image processing apparatus 100 applies histogram equalization to the input image (S422).

When the sub-image is not required to be redivided as a result of the determination in operation S418, the image processing apparatus 100 applies histogram equalization to the corresponding sub-image (S424).

The image processing apparatus and method according to some embodiments of the present invention have an effect of efficiently improving the quality of the image by determining whether histogram equalization is required for each sub-image while hierarchically dividing the image, and performing histogram equalization only for the sub-images that require histogram equalization.

An image processing apparatus and method according to some embodiments of the present invention have an effect of efficiently improving the quality of an image by determining whether histogram equalization is required for each sub-image while hierarchically dividing the image, and performing histogram equalization only for the sub-images that require histogram equalization.

While the present invention has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the technical protection scope of the present invention should be determined by the appended claims.

What is claimed is:

1. An image processing apparatus comprising:
a memory; and
a processor connected to the memory,
wherein the processor is configured to:
divide an input image into a plurality of sub-images;
determine whether each sub-image requires histogram equalization based on histogram characteristics of each sub-image;
repeat a process of dividing a sub-image that requires histogram equalization until a subsequent sub-image becomes equal to or less than a preset reference image size, and determining whether each subsequent sub-image requires histogram equalization; and
perform histogram equalization only on a subsequent sub-image that requires histogram equalization among subsequent sub-images divided to be equal to or less than the preset reference image size,
wherein the processor determines whether histogram equalization is required based on a deviation between a graph of a cumulative distribution function (CDF) of the histogram and a slope of an approximated straight line of the CDF.

2. An image processing method comprising:

hierarchically dividing, by a processor, an input image into sub-images by:

dividing the input image into a plurality of sub-images;

determining whether each of the sub-images requires histogram equalization based on histogram characteristics of each of the sub-images; and iteratively dividing a sub-image determined to require histogram equalization until a subsequent sub-image becomes equal to or less than a preset reference image size, and determining whether each subsequent sub-image requires histogram equalization; and performing, by the processor, histogram equalization only on a subsequent sub-image determined to require histogram equalization among subsequent sub-images divided to be equal to or less than the preset reference image size, wherein the determining of whether histogram equalization is required is based on a deviation between a graph of a cumulative distribution function (CDF) of a histogram and a slope of an approximated straight line of the CDF.

3. An image processing method comprising:

determining, by a processor, whether histogram equalization is required based on a histogram of an input image;

determining, by the processor, whether the input image is required to be divided by comparing the input image with a preset reference image size, when histogram equalization of the input image is required;

dividing, by the processor, the input image into a plurality of first sub-images when the division of the input image is required;

determining, by the processor, whether each of the first sub-images requires histogram equalization based on a histogram of each of the first sub-images; and determining, by the processor, when a first sub-image requiring histogram equalization exists among the first sub-images, whether the corresponding first sub-image is required to be divided by comparing the corresponding first sub-image with the preset reference image size, dividing the first sub-image requiring to be divided into a plurality of second sub-images, performing repeatedly a process of dividing and determining whether to apply histogram equalization in a hierarchical structure until a second sub-image requiring histogram equalization among the second sub-images is divided to a size equal to or less than the preset reference image size, and performing histogram equalization only on a sub-image determined to require histogram equalization among sub-images divided to be equal to or less than the preset reference image size, wherein, in the determining of whether histogram equalization is required, the processor determines whether histogram equalization is required based on a deviation between a graph of a cumulative distribution function (CDF) of the histogram and a slope of an approximated straight line of the CDF.

4. The image processing method of claim 3, wherein, in the performing of histogram equalization, the processor performs histogram equalization on a first sub-image that is not required to be divided among the first sub-images requiring histogram equalization.

* * * * *